Jan. 16, 1962   J. O. CONVERSE   3,017,126
APPARATUS FOR MILLING
Filed May 28, 1958
FIG. 1
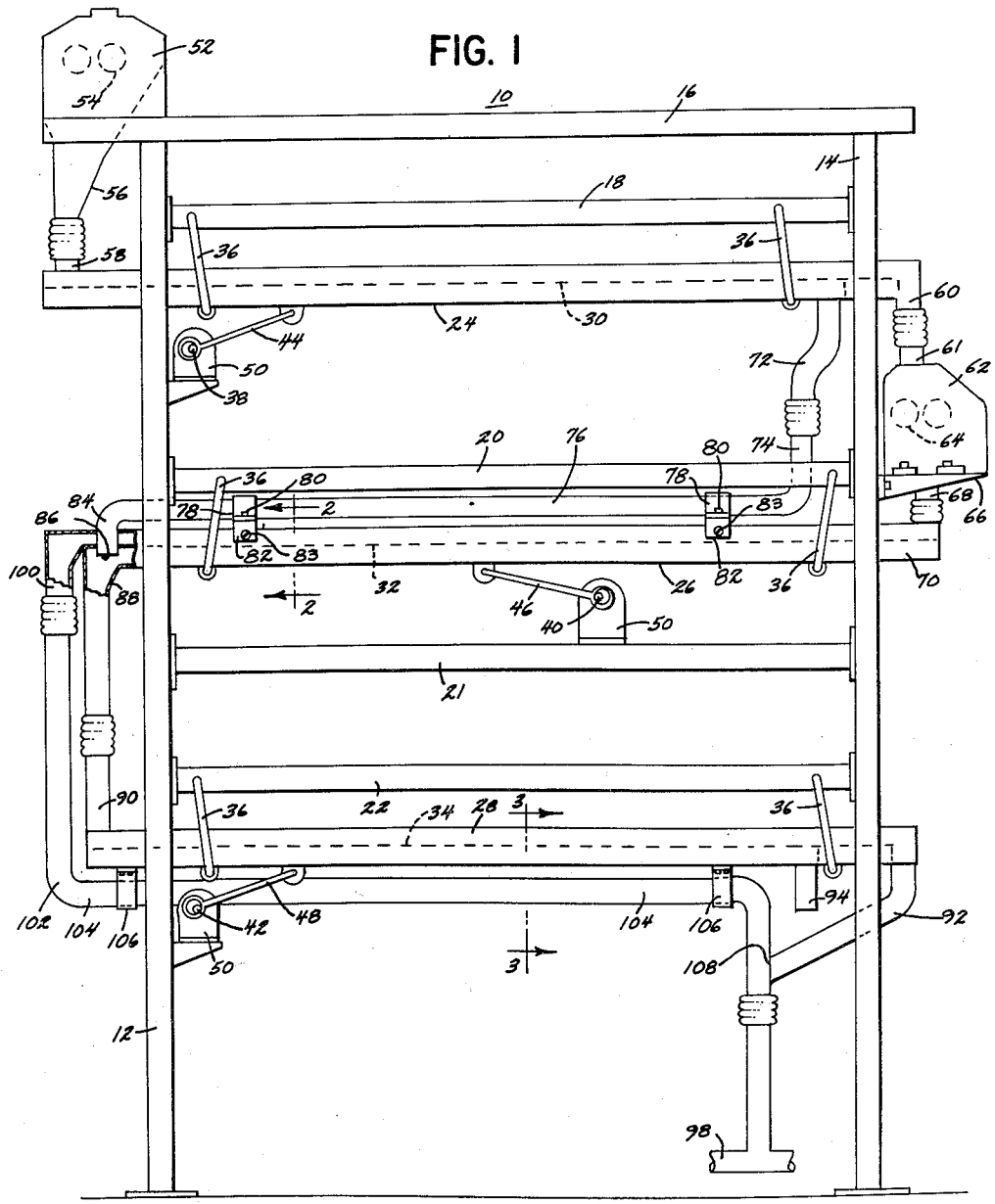
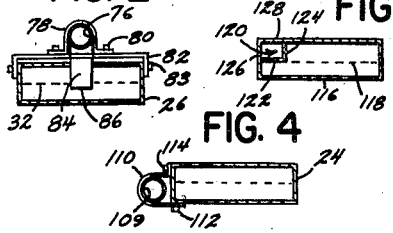
FIG. 3
INVENTOR.
JOHN O. CONVERSE
BY
William C. Babcock
ATTORNEY

United States Patent Office 3,017,126
Patented Jan. 16, 1962

3,017,126
APPARATUS FOR MILLING
John O. Converse, Minneapolis, Minn., assignor to General Mills, Inc., a corporation of Delaware
Filed May 28, 1958, Ser. No. 738,479
3 Claims. (Cl. 241—77)

This application relates to improved milling apparatus and more particularly to improved arrangements for classifying and conveying materials in a stacked milling unit.

Stacked milling units have been suggested in the prior art in which a plurality of milling machines and classifiers are mounted in stacked arrangement in a single frame. One such device is shown in Buchholz United States Patent 97,038. In that case stock is fed from one milling machine, such as the break rolls of a flour milling process, across the stack on a reciprocating sifter to classify the stock at least in part before it reaches the end of the sifter. At the discharge end of the sifter a further milling machine may receive one of the stocks for additional processing.

One problem in such a stacked mill arrangement is to provide desired stocks at the exact point in the stack where they are desired for further operation.

Stocks which have been segregated by the classifiers at one point in the frame may be needed for further processing at a different point in the frame, either for further processing or for conveying to other portions of a mill installation.

With these problems of the prior art in view it is one object to provide an improved stacked mill arrangement of increased flexibility in the handling of various stocks.

A further object is a stacked milling unit in which reciprocating sifters also provide the means for conveying unsifted stocks from one point in the stack to another.

Other objects and advantages will be apparent from the following specification. In general, the above objects are accomplished by utilizing the reciprocating movements of the various sifters in the stack to actuate one or more reciprocating conveyors which can transfer the stock laterally without classification. The conveyors may take various forms. For example, closed conveying tubes may be secured to the top, bottom or sides of a reciprocating sifter or incorporated as an integral part of the body design in such a sifter.

In the drawings which form a part of this application,

FIGURE 1 is a side elevation of a stacked milling unit embodying preferred forms of this invention, certain portions being broken away for clarity;

FIG. 2 is a sectional view on the line 2—2 of FIG. 1, showing sifter and conveyor details with hanger and supporting frame members omitted for clarity;

FIG. 3 is a similar sectional view on the line 3—3 of FIG. 1;

FIG. 4 is a view similar to FIG. 3 of another modification of the invention; and FIG. 5 is a similar view of a further modification.

As shown in FIG. 1, the features of the present invention are disclosed in connection with a stacked milling unit having a supporting frame 10. This frame includes a plurality of vertical columns 12 and 14 for supporting various processing machines. Suitable cross members 16, 18, 20, 21 and 22 are also provided to strengthen the frame and to furnish support for certain portions of the units.

The stacked milling unit includes one or more reciprocating, classifying, or sifting devices as shown at 24, 26 and 28. These reciprocating classifiers are vertically spaced in the frame and are provided with suitable sifting surfaces 30, 32, and 34, respectively. The reciprocating sifters are supported in the frame by suitable hangers 36 which may be inclined to permit reciprocation along the desired sifting and conveying path.

The means for reciprocating the sifters may include a plurality of drive shafts 38, 40, and 42 connected to the respective sifters by suitable eccentrics and connecting rods 44, 46, and 48. Thus rotation of the shafts 38, 40, and 42 will cause reciprocation of the respective sifters in a direction generally perpendicular to the hangers 36. Suitable coordination of the frequency and amplitude of reciprocation, together with the angular orientation of the sifting surfaces and the position of the hangers 36 can be used to provide conveying movement of stock from the receiving end to the discharge end of each of the classifiers. One or more motors 50 may be used to actuate the driving shafts 38, 40, and 42.

The stacked milling unit of FIG. 1 includes a milling machine 52 mounted at the top 16 of the frame above one or more of the classifiers. This milling unit 52 may include milling rolls 54 which grind suitable stock and discharge it through an outlet 56 into the inlet 58 or receiving end of the reciprocating sifter 24. As the sifter is operated, the stock will be fed from this receiving end to the opposite end of the sifter.

The stock is fed to the opposite end of the sifter and is at least partly classified by the sifting surface 30, with those particles fine enough to pass through the screen 30 carried along the bottom of the sifter. The overs of the sifting surface are discharged at an outlet 60 and this first grade of stock is then fed directly at 61 to the inlet of another milling machine 62 which includes milling rolls 64. Milling unit 64 is supported on a suitable bracket 66 on the frame. This first grade of stock is suitably processed by milling rolls 64 and then discharged at 68 into the receiving end 70 of the next lower sifter 26. This first grade of stock then passes across the sifting surface 32 and is further classified into the overs and the throughs of screen 32.

The upper sifter 24 has a second outlet 72 for a second grade of stock, i.e., the stock which has passed through the sifting surface 30. This stock is fed at 74 to the inlet end of a suitable conveying member. This conveying member is shown in the form of a closed tubular conduit 76. According to one embodiment of the invention, conveyor 76 is secured to the top of reciprocating sifter 26. Details of the support and securing arrangement are shown in FIG. 2. Here the conveying tube 76 is held by a clamp 78 secured by bolts 80 to a supporting bracket 82 which, in turn, is secured at 83 to the sifter body. Thus the conveying tube 76 is rigidly secured to the top of sifter 26 for reciprocating movement as a unit with the sifter.

At the opposite or discharge end of the sifter 26, the conveying member 76 has an outlet 84. This outlet 84 may feed the grade of stock which has been received from outlet 72 of the upper sifter to any desired processing machine at this other end of the stacked unit. As one example, FIG. 2 shows this outlet 84 extending downwardly through the reciprocating sifter 26 to feed the stock from conveyor 76 through its outlet end 86 into a common outlet with one of the stocks separated by classifier 26. In this case outlet 84 discharges into sifter outlet 88 through which stock which has passed downwardly through sifting surface 32 is to be discharged. Thus the throughs of the sifting surface 32 of sifter 26 will, in effect, be combined with the throughs from the sifting surface 30 of the upper classifier and these two stocks will both be discharged together at 88.

At this point they may be fed to any desired further processing machine (such as another roller milling unit, another sifter, or some other device). For purposes of illustration, the stocks discharged at 88 are fed into the inlet 90 of the next lower reciprocating sifter 28. The stocks then pass across the sifting surface 34 and the overs of such surface are discharged at 92 through the outlet end of the sifter. The stock which passes through the sifting surface 34 is then separately discharged at 94. The outlet 92 for the overs of screen 34 may feed such material into a pneumatic conveyor 98 for transportation to a suitable storage or further processing unit.

The remaining stock from the upper sifter 26, i.e., the stock which has passed over the screen 32, is discharged at 100 and may be conveyed from this point according to the invention to some other point in the stack for further handling. For purposes of further illustration, this stock is shown as fed into the inlet 102 of another conveying member or conduit 104 supported at 106 from the bottom of the lower sifter 28. In this case the discharge end 108 of the lower conduit 104 is connected to the outlet 92 from the reciprocating conveyor and sifter 28 so that the stocks which have passed over the screens 32 and 34 of the respective classifiers 26 and 28 will be combined and fed jointly to the pneumatic conveyor 98.

As shown in FIG. 4, it is also possible to mount the auxiliary conveying member at the side of the reciprocating sifter. Here the conveying tube 109 is supported by bracket members 110 which are secured at 112 and 114 to the sifter body, such as sifter 24.

As shown in FIG. 5, it is also possible to supply a sifter body 116 having a sifting surface 118 with a built-in conveying tube 120 formed by imperforate wall portions 122 and 124 at the bottom and one side, and by the sifter body side wall 126 and the sifter top wall 128 at the other side and top.

According to the foregoing description, it is possible to utilize a reciprocating sifter in a stacked milling unit to provide supporting and actuating means for one or more associated conveying members, and thus to provide convenient lateral transportation for stocks which are discharged at one point in the stack and are needed for further handling or processing at a different lateral position in the stack. The description sets forth the principles by which this invention may be practiced and some of the ways of carrying it out.

Now, therefore, I claim:

1. A stacked milling unit comprising a supporting frame, at least two vertically spaced classifiers on said frame, the lower of said two classifiers being a reciprocating sifter having a sifting surface therein and receiving and discharge ends, means for reciprocating said sifter and thereby conveying stock along said sifting surface from its receiving to its discharge end while at least partially classifying said stock, a milling machine mounted on said frame in position to receive one grade of stock from the upper classifier, to perform a milling operation on said stock and to discharge the resulting product into the receiving end of the lower classifier, a closed separate conveying tube mounted on the lower classifier for reciprocation therewith and having receiving and discharge ends corresponding to the receiving and discharge ends of the sifter, and means for guiding a second grade of stock from the upper classifier into the receiving end of the conveying tube, thereby also moving said second grade of stock across the frame in response to movement of said reciprocating means and discharging said first and second grades of stock at the same end of the sifter.

2. A stacked milling unit according to claim 1 in which said sifter has one outlet for tailings stock passing over said sifting surface and another outlet for sifted stock that has passed through the sifting surface, and the discharge end of said conveying tube feeds the conveyed stock to one of said tailings and sifted stock outlets.

3. A stacked milling unit according to claim 2 having an additional processing machine mounted on said frame, means for feeding the stock from said sifted stock outlet to said additional processing machine, and said discharge end of said conveying tube feeding the conveyed stock from said upper classifier to said additional processing machine with said sifted stock.

References Cited in the file of this patent

UNITED STATES PATENTS

| 744,567 | Krusemark | Nov. 17, 1903 |
| 1,358,103 | Otto | Nov. 9, 1920 |
| 1,594,633 | Schar | Aug. 3, 1926 |

FOREIGN PATENTS

| 16,171 | Great Britain | of 1912 |
| 451,104 | Germany | Oct. 21, 1927 |